United States Patent
Tateishi et al.

(10) Patent No.: US 7,027,565 B2
(45) Date of Patent: Apr. 11, 2006

(54) VOICE CONTROL SYSTEM NOTIFYING EXECUTION RESULT INCLUDING UTTERED SPEECH CONTENT

(75) Inventors: Masahiko Tateishi, Nagoya (JP); Kunio Yokoi, Nagoya (JP)

(73) Assignee: Denso Corporation, Kariya (JP)

( * ) Notice: Subject to any disclaimer, the term of this patent is extended or adjusted under 35 U.S.C. 154(b) by 123 days.

(21) Appl. No.: 10/430,280

(22) Filed: May 7, 2003

(65) Prior Publication Data

US 2003/0235276 A1 Dec. 25, 2003

(30) Foreign Application Priority Data

Jun. 25, 2002 (JP) ............................. 2002-183927

(51) Int. Cl.
*H04M 1/64* (2006.01)
(52) U.S. Cl. .............................. 379/88.01; 379/88.02; 379/88.03; 379/88.04; 379/88.07; 379/88.11; 379/88.12; 379/88.19
(58) Field of Classification Search ........... 379/201.01, 379/201.07, 88.01, 88.02, 88.03, 88.04, 88.07, 379/88.11, 88.12, 88.17, 88.18; 455/436, 455/432
See application file for complete search history.

(56) References Cited

U.S. PATENT DOCUMENTS

| 4,873,714 A | 10/1989 | Ishii et al. ............... 379/88.03 |
| 4,949,374 A | 8/1990 | Ishii et al. ............... 379/88.04 |
| 5,182,765 A | 1/1993 | Ishii et al. ............... 379/88.03 |
| 5,652,789 A * | 7/1997 | Miner et al. ........... 379/201.01 |
| 2002/0049535 A1 * | 4/2002 | Rigo et al. |
| 2003/0045279 A1 * | 3/2003 | Shostak |

FOREIGN PATENT DOCUMENTS

| JP | A-60-260094 | 12/1985 |
| JP | A-64-56428 | 3/1989 |
| JP | A-11-249690 | 9/1999 |
| JP | A-2000-29490 | 1/2000 |
| JP | A-2000-214525 | 8/2000 |
| JP | A-2001-5491 | 12/2001 |

* cited by examiner

*Primary Examiner*—Allan Hoosain
(74) *Attorney, Agent, or Firm*—Posz Law Group, PLC

(57) ABSTRACT

A voice recognition unit recognizes a recognition word code corresponding to a speech uttered by a user along with a command code for executing a function of a control object. A function execution unit executes a function corresponding to the command code from the voice recognition unit. A message outputting unit extracts a recognition word corresponding to the recognition word code from a recognition word storing unit, and generates a message properly utilizing the extracted recognition word. The generated message is notified to the user via a display or a speaker, so that the user can confirm that the uttered speech is adequately recognized.

13 Claims, 9 Drawing Sheets

| VOICE INPUT | SPEECH CONTENT | REC. WORD CODE | COMMAND CODE |
|---|---|---|---|
| "enlarge" | "ENLARGE" | R0002 | C0002 |
| "zoom in" | "ZOOM IN" | R0003 | C0002 |

| SPEECH CONTENT | REC. WORD CODE |
|---|---|
| "CURRENT POSITION" | R0001 |
| "ENLARGE" | R0002 |
| "ZOOM IN" | R0003 |
| "WIDE AREA" | R0004 |
| "ZOOM OUT" | R0005 |
| ⋮ | ⋮ |

FIG. 5

| REC. WORD CODE | COMMAND CODE |
|---|---|
| R0001 | C0001 |
| R0002 | C0002 |
| R0003 | C0002 |
| R0004 | C0003 |
| R0005 | C0003 |
| ⋮ | ⋮ |

FIG. 6

| VOICE INPUT | SPEECH CONTENT | REC. WORD CODE | COMMAND CODE |
|---|---|---|---|
| "enlarge" | "ENLARGE" | R0002 | C0002 |
| "zoom in" | "ZOOM IN" | R0003 | C0002 |

FIG. 7

| COMMAND CODE | RESULT | MESSAGE FORMAT |
|---|---|---|
| C0001 | SUCCESS | CURRENT POSITION IS TO BE DISPLAYED |
| C0001 | FAILURE | CURRENT POSITION IS NOT DISPLAYED |
| C0002 | SUCCESS | MAP IS TO BE (REC. WORD). |
| C0002 | FAILURE | MAP IS NO MORE (REC. WORD). |
| C0003 | SUCCESS | MAP IS TO BE (REC. WORD). |
| C0003 | FAILURE | MAP IS NO MORE (REC. WORD). |
| ⋮ | ⋮ | ⋮ |

FIG. 8

| REC. WORD CODE | REC. WORD |
|---|---|
| R0001 | CURRENT POSITION |
| R0002 | ENLARGEMENT |
| R0003 | ZOOM-IN |
| R0004 | WIDE AREA |
| R0005 | ZOOM-OUT |
| ⋮ | ⋮ |

VOICE CONTROL SYSTEM NOTIFYING EXECUTION RESULT INCLUDING UTTERED SPEECH CONTENT

CROSS REFERENCE TO RELATED APPLICATIONS

This application is based on and incorporates herein by reference Japanese Patent Application No. 2002-183927 filed on Jun. 25, 2002.

FIELD OF THE INVENTION

The present invention relates to a voice control system notifying an execution result as a message that properly includes a speech content uttered by a user.

BACKGROUND OF THE INVENTION

A speech uttered by a speaker is conventionally used for controlling a strobe light or a shutter of a camera. For instance, in JP-A-S64-56428, a camera control system using a voice input is described as follows: a speech corresponding to required manipulation is inputted; the speech is recognized by a voice recognition unit; and the camera is controlled based on a control processing corresponding to a recognition result.

In this voice-controlled camera, a certain function can be executed by a certain voice input having one-to-one correspondence with the certain function. For instance, only "no strobe" is functional as the certain voice input for prohibiting a strobe light at shooting, even though "strobe off," "stop strobe," or "flash off" may be used depending on a user.

By contrast, in JP-A-2000-214525, a different speech can be also functional as a voice input for executing a predetermined function of a voice-controlled camera. In this voice-controlled camera, a plurality of speeches are stored as the voice inputs corresponding to the predetermined function. Inputting any one of the plurality of the speeches thereby enables the predetermined function to be executed.

This kind of the voice recognition system that accepts different input speeches is adopted not only for the voice-controlled camera but also a car navigation device. For instance a user can use either "zoom in" or "enlarge" as a voice input in switching a scale of a road map so that the car navigation device can execute enlargement of the road map. Furthermore, the car navigation device notifies the user of content of executed function through a guidance voice. For instance, as a user utters "zoom in," the car navigation device notifies to the user "MAP IS TO BE ZOOMED IN" as the guidance voice.

However, in the above car navigation device, even when the user utters "enlarge" in stead of "zoom in," the device similarly notifies to the user "MAP IS TO BE ZOOMED IN." In this case, "ZOOMED IN" that is different from "enlarge" is included in the guidance voice, so that the user may misunderstand that the inputted speech of "enlarge" is mis-recognized.

SUMMARY OF THE INVENTION

It is an object of the present invention to provide a voice control system that prevents a user from misunderstanding that a speech uttered by the user is mis-recognized.

To achieve the above object, a voice control system is provided with the following. A speech uttered by a user is inputted to be recognized as a speech content. The speech content and a command code used for executing a function of a control object are stored as a pair. Here, the command code is correlated with the speech content and has one-to-one or one-to-many correspondence with the speech content. The command code is extracted based on the speech content as which the uttered speech is recognized when the speech is inputted. The function is executed based on the extracted command code. A message corresponding to the executed function is generated to be notified when the function is executed through the command code. Here, in a case that the command code has one-to-many correspondence with the speech content, the message is generated by utilizing the recognized speech content.

This structure enables the uttered speech by the user to be properly included in the notified message, so that the user is prevented from misunderstanding that the uttered speech might be mis-recognized.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A car navigation device provided in a vehicle will be explained as an embodiment that a voice control system of the present invention is directed to.

Figure 1:
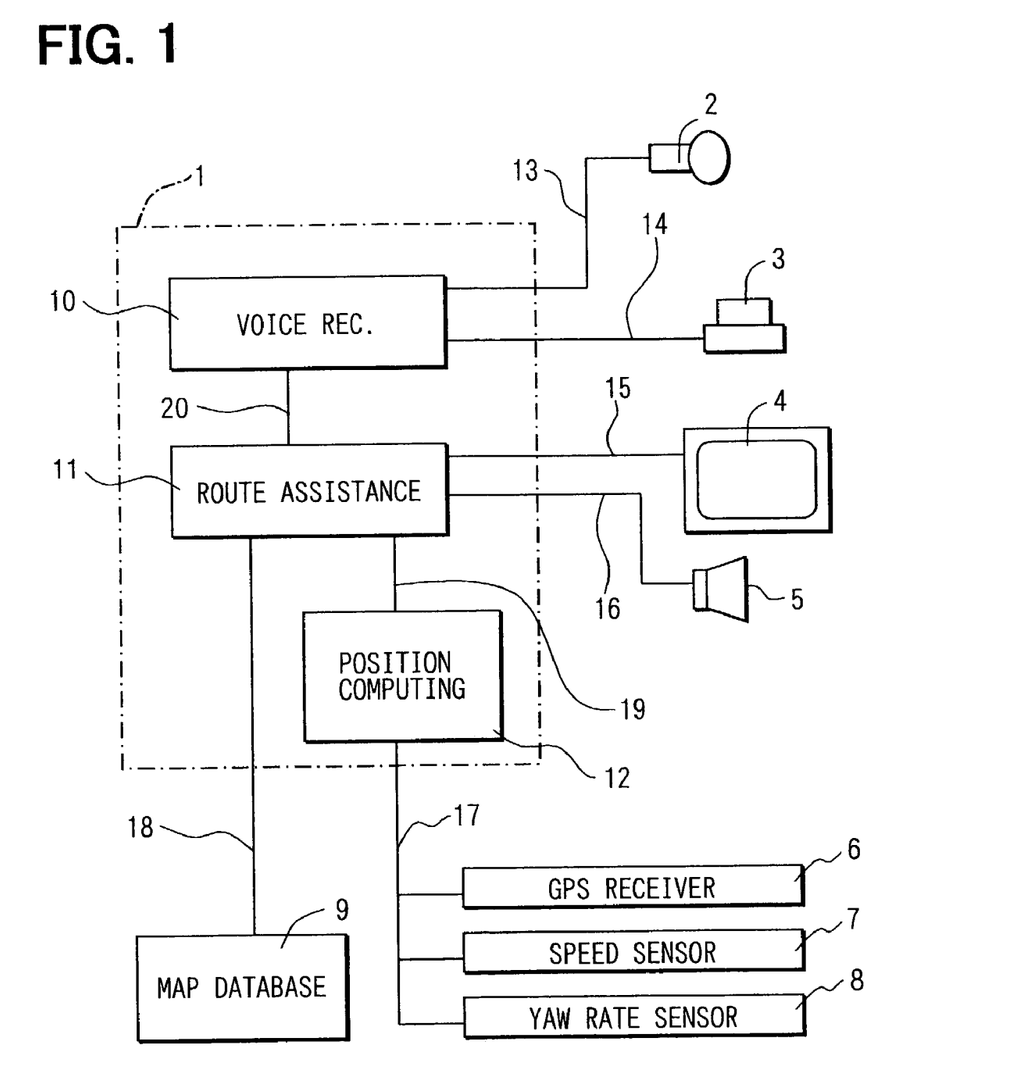
FIG. 1 is a schematic block diagram showing structure of a car navigation system according to an embodiment of the present invention.

As shown in FIG. 1, the car navigation device 1 includes a voice recognition (REC.) unit 10, a route assistance unit 11, a vehicle position and direction computing unit 12, and a road map drawing unit (not shown). The car navigation device 1 is connected with a microphone 2 for inputting a voice, a talk switch 3, a display unit 4, a speaker 5, a GPS receiver 6, a vehicle speed sensor 7, a yaw rate sensor 8, a map database 9, and the like.

The microphone 2 and the talk switch 3 are used for voice input. As a push button of the talk switch 3 is pushed, an input trigger 14 is sent to the voice recognition unit 10. As the voice recognition unit 10 receives the input trigger 14, it shifts to a voice input mode of accepting the voice input through the microphone 2.

At the voice input mode, as a user utters "current position," the speech is converted to a voice signal 13 through the microphone 2 to be sent to the voice recognition unit 10. The voice recognition unit 10 recognizes the voice signal 13 to convert into a manipulation command corresponding to the speech. The manipulation command 20 is sent to the route assistance unit 11 and the like. For instance, as a speech is recognized as "CURRENT POSITION," a manipulation command of "DISPLAY CURRENT POSITION" is produced accordingly. The route assistance unit 11 receives the manipulation command thereby to display a road map surrounding the current position into the display unit 4. The manipulation command 20 includes a recognition word code 21 and a command code 22.

The display unit 4 is formed of a liquid crystal display showing a road map or the like. A scale of the displayed road map can be switched through the voice input, remote control manipulation, or panel manipulation (both are not shown). A touch panel can be used for the display unit 4.

The speaker 5 is used for outputting voice guidance 16 or various alarms. For instance, it can be a speaker that is previously installed in the vehicle or a speaker that is built in the car navigation device 1.

The GPS receiver 6, the vehicle speed sensor 7, and the yaw rate sensor 8 generate necessary signals (sensor signals 17) used for computing a current position or a traveling direction of the vehicle. The generated sensor signals 17 are sent to the vehicle position and direction computing unit 12.

The map database 9 is stored in a storage (not shown) and includes map information and road information. Although CD-ROM or DVD-ROM is generally used as the storage depending on a data amount, a memory card or a hard disk drive can be also used.

Figure 2:
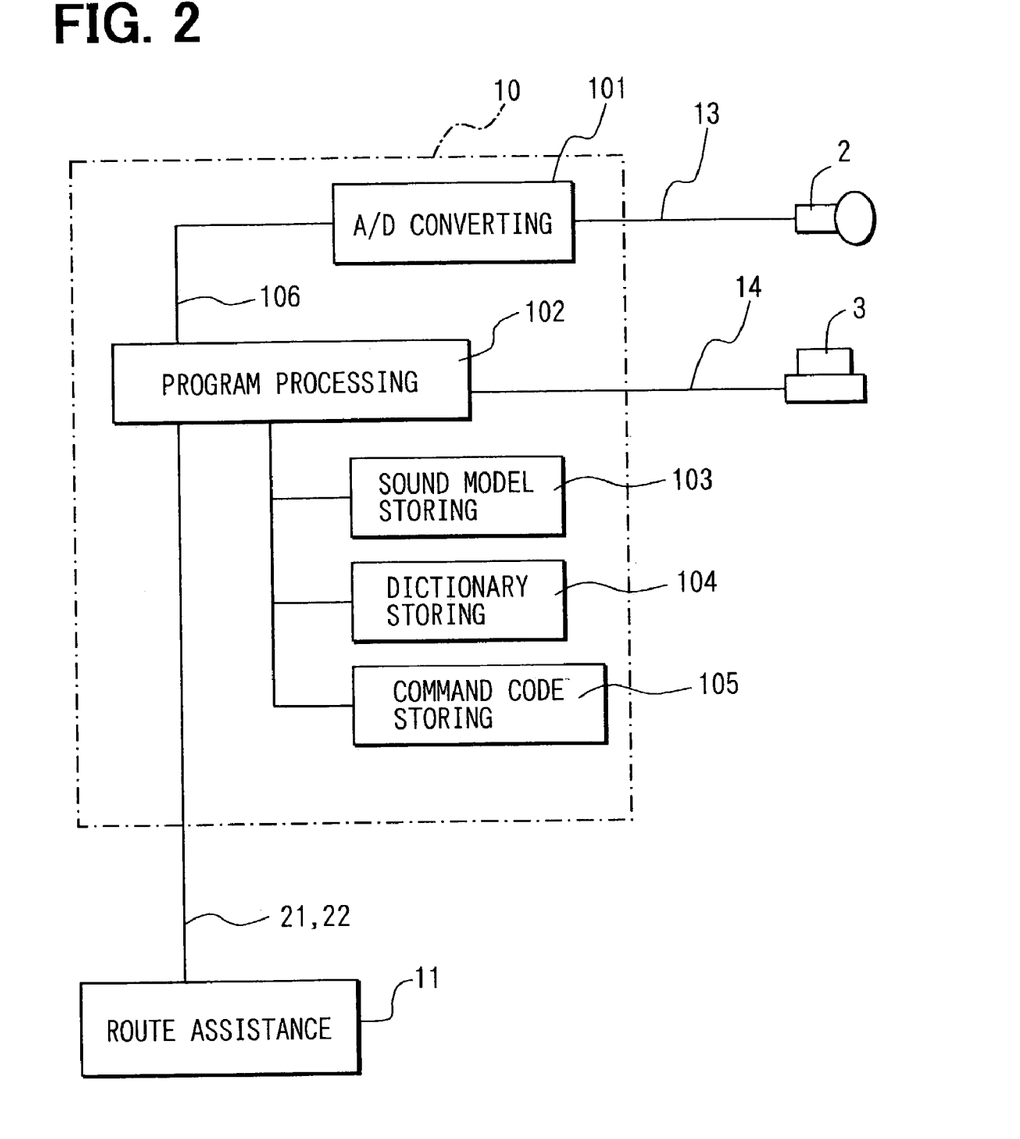
FIG. 2 is a block diagram showing structure of a voice recognition unit according to the embodiment.

Referring to FIG. 2, the voice recognition unit 10 of the car navigation device 1 will be explained below. The voice recognition unit 10 includes an A/D converting circuit 101, a recognition program processing unit 102, a sound model storing unit 103, a recognition dictionary storing unit 104, a command code storing unit 105, and the like.

The A/D converting circuit 101 converts, into a digital signal, an analog voice signal 13 that is received from the microphone 2. The converted digital voice signal 106 is then sent to the recognition program processing unit 102.

Figure 4:
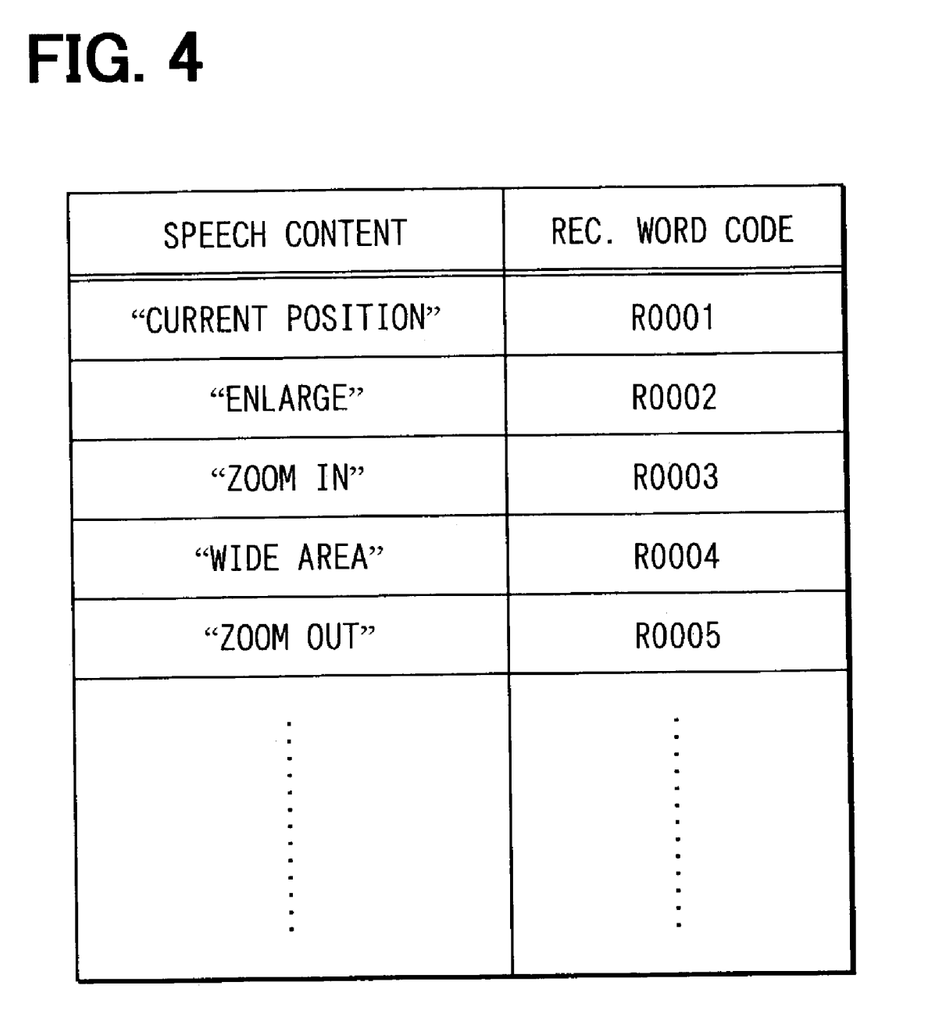
FIG. 4 is a table showing relationship between a speech content and a voice recognition code according to the embodiment.

The recognition program processing unit 102 converts, using the sound model storing unit 103 and the recognition dictionary storing unit 104, the digital voice signal 106 into the recognition word code 21. The recognition program processing unit 102 analyzes a speech content corresponding to the digital voice signal 106 by using, e.g., known Hidden Markov Model stored in the sound model storing unit 103. This analyzed speech content is then collated with speech contents stored in the recognition dictionary storing unit 104, so that the most probable speech content and its corresponding recognition word code 21 are extracted as shown in FIG. 4. For instance, when a speech content is "CURRENT POSITION," R0001 of a recognition word code 21 corresponding to this is extracted. The recognition word code 21 can be recognized by the message outputting unit 111 of the route assistance unit 11.

Figure 5:
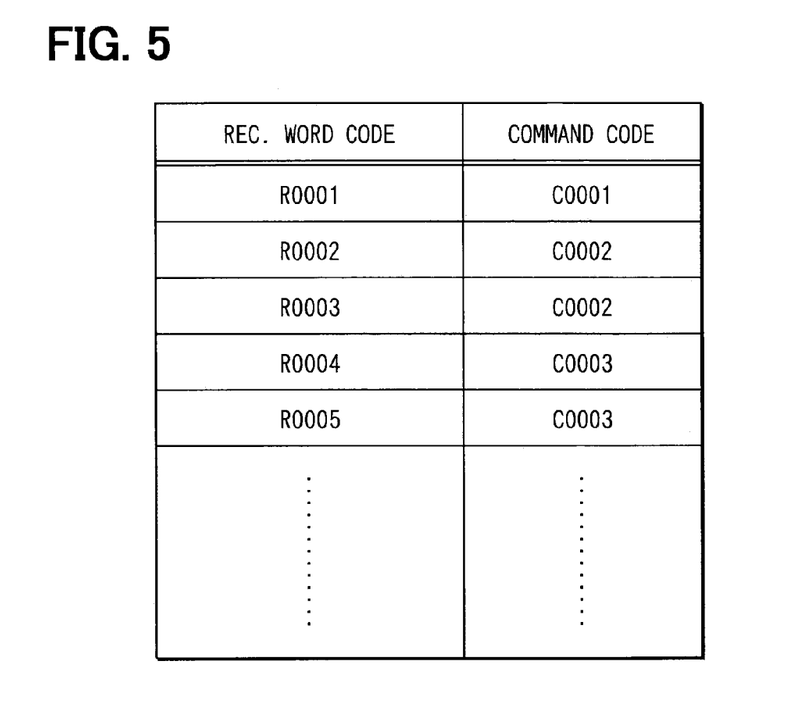
FIG. 5 is a table showing relationship between a recognition word code and a command code according to the embodiment.

The recognition program processing unit 102 extracts, with referring to the command code storing unit 105, a command code 22 corresponding to the recognition word code 21. Structure of the command code storing unit 105 is shown in FIG. 5. For instance, C0001 is extracted as the command code 22 corresponding to R0001 of the recognition word code 21. The command code 22 can be recognized by the function execution unit 110 of the route assistance unit 11.

The recognition program processing unit 102 then outputs the recognition word code 21 and command code 22, both of which are obtained in the above processing, to the route assistance unit 11. For instance, when "current position" is inputted, the recognition word code 21 (R0001) and the command code 22 (C0001) are outputted.

Figure 6:
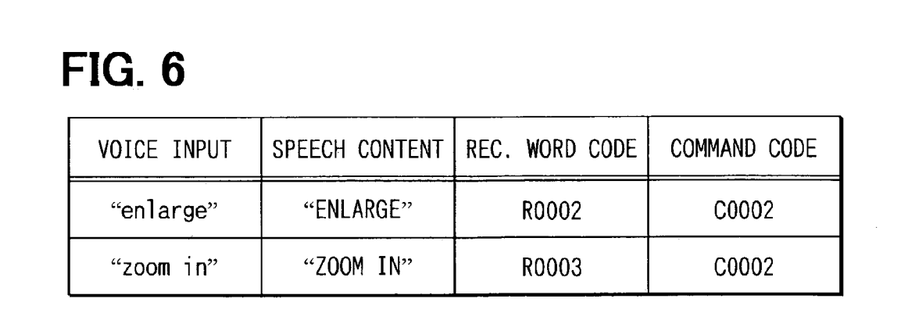
FIG. 6 is a table showing relationship among a voice input, a speech content, a recognition word code, and a command code according to the embodiment.

The speech content has one-to-one correspondence with the recognition word code 21, while the command code 22 has one-to-many correspondence with the recognition word code 21 as shown in FIG. 5. This one-to-many correspondence enables the voice control system to respond to different speeches that correspond to a certain instruction by the user. For instance, "enlarge" and "zoom in" of the voice inputs are converted into the same command code of C0002 as shown in FIG. 6. The command code of C0002 corresponds to a manipulation of "SCALING UP MAP" in the function execution unit 110.

Figure 3:
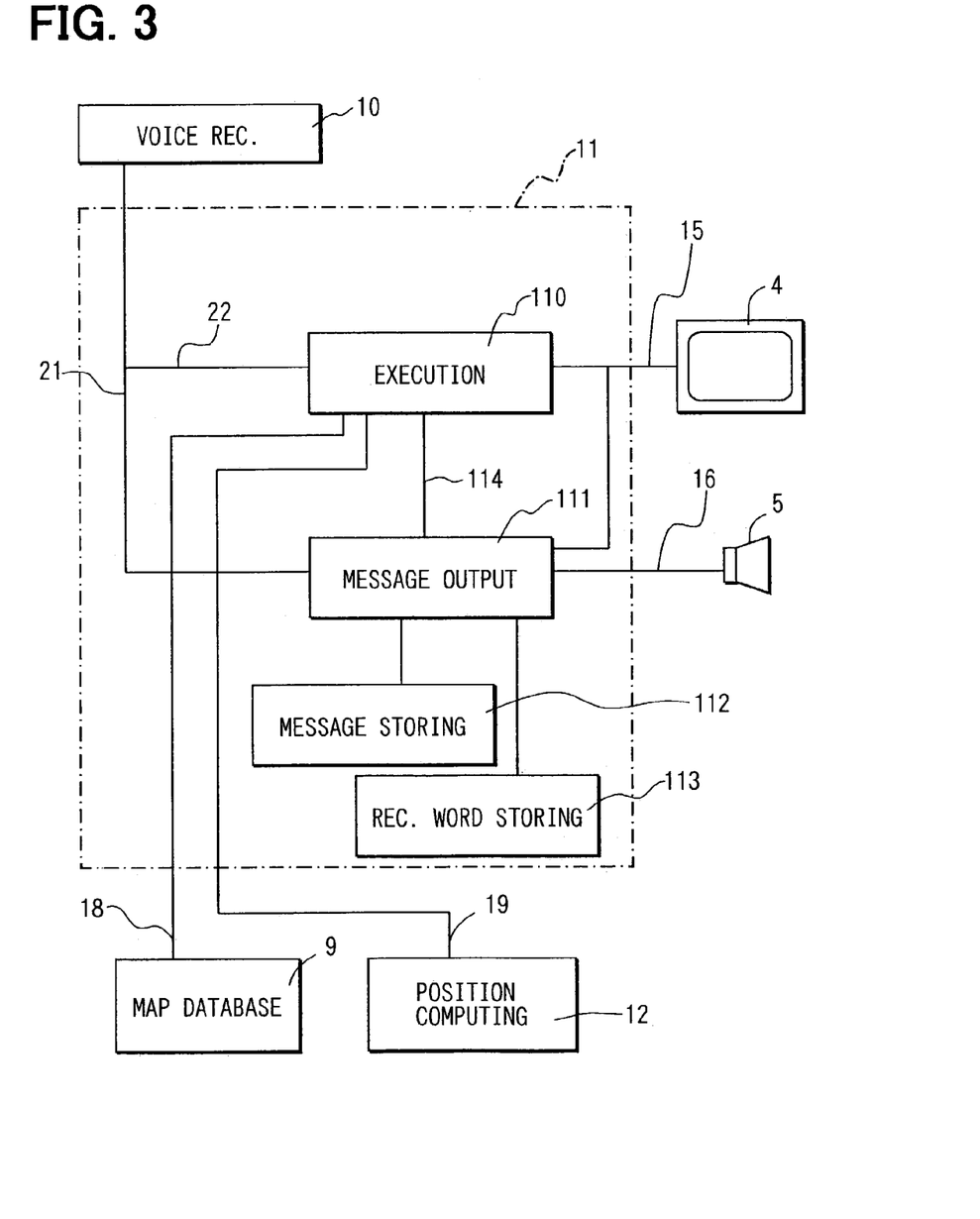
FIG. 3 is a block diagram showing structure of a route assistance unit according to the embodiment.

The route assistance unit 11 of the car navigation device 1 will be explained below, referring to FIG. 3. The route assistance unit 11 includes the function execution unit 110, the message outputting unit 111, a message storing unit 112, and a recognition word storing unit 113.

The function execution unit 110 executes a function corresponding to the command code 22 received from the voice recognition unit 10. The executed functions are, for instance, switching a scale of a road map displayed in the display unit 4, changing a displaying orientation of the road map and the like. When the command code 22 for drawing a road map surrounding current position of the vehicle is received, signals 19 of the current position and traveling direction of the vehicle are obtained from the vehicle position and direction computing unit 12, and map data 18 surrounding the vehicle are read from the map database 9. The signals 19 and the map data 18 are then converted into image signals 15 and displayed on the display unit 4.

The function execution unit 110 then sends the command code 22 and an execution result of the executed function 114 to the message outputting unit 111. Here, the execution result 114 is either "SUCCESS" or "FAILURE" and indicates whether the execution for the function corresponding to the command code 22 succeeds in.

The message outputting unit 111 receives the command code 22 and the execution result 114 to extract a corresponding message format from the message storing unit 112. It then generates an outputting message from the extracted message format. The message outputting unit 111 furthermore receives the recognition word code 21 from the voice recognition unit 10, to retrieve a corresponding recognition word from the recognition word storing unit 113. It then adds the retrieved recognition word into the above message format.

Figure 7:
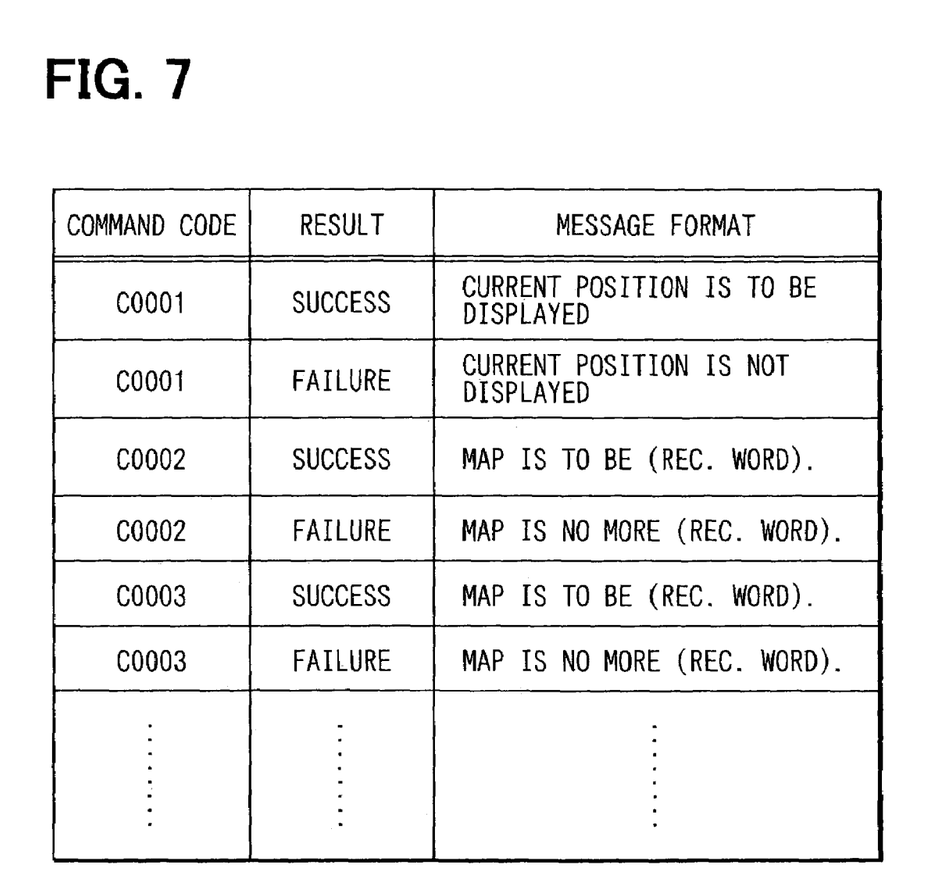
FIG. 7 is a table showing relationship among a command code, an execution result, and a message format according to the embodiment.

The message formats stored in the message storing unit 112 are shown in FIG. 7. Each message format that is determined by combination of the command code 22 and the execution result 114 is sent to the message outputting unit 111.

Figure 8:
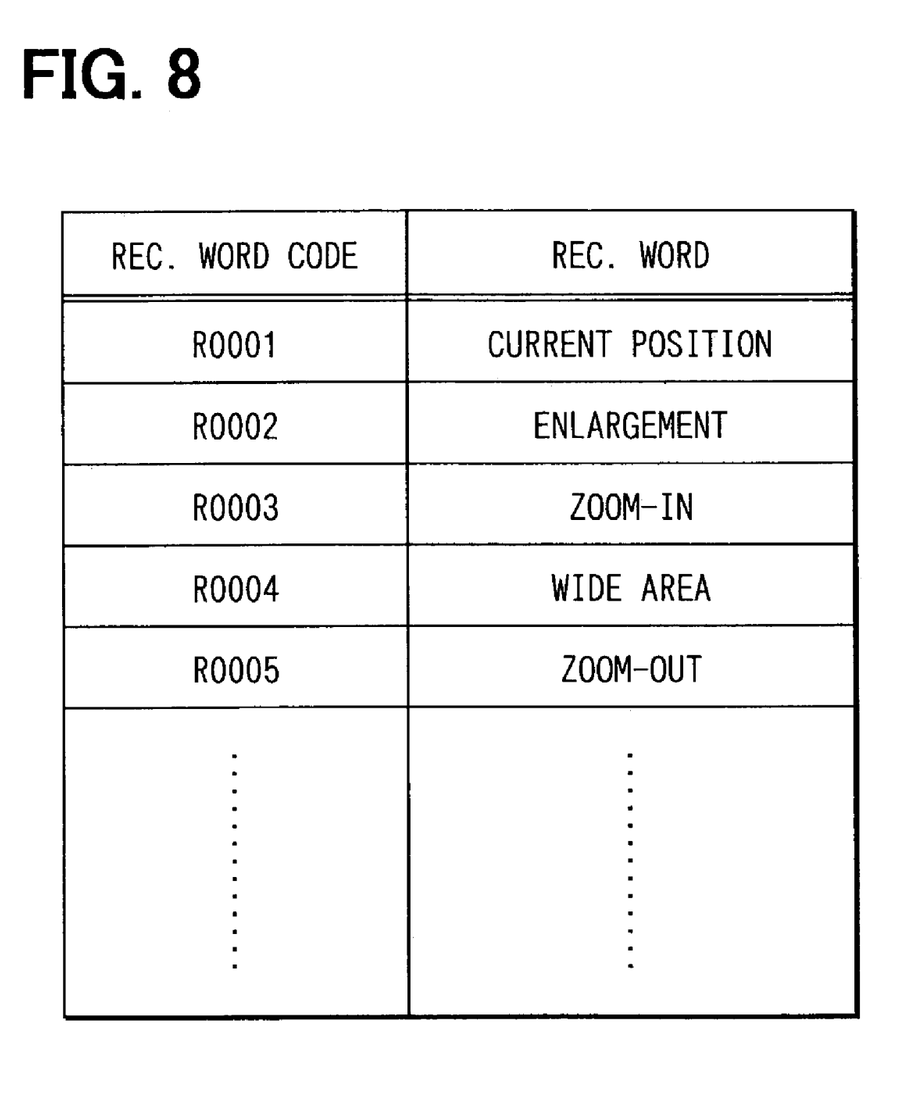
FIG. 8 is a table showing relationship between a recognition word code and a recognition word according to the embodiment.

In some message formats shown in FIG. 7, (REC. WORD) is inserted. One of recognition words stored in the recognition word storing unit 113 shown in FIG. 8 is properly inserted in (REC. WORD). The processing of inserting the recognition word is executed by the message outputting unit 113. Namely, the message outputting unit 113 generates a final message by properly inserting the recognition word. For instance, when the recognition word is "ZOOM-IN," the message format in the third row becomes "MAP IS TO BE ZOOMED IN." The final message is then outputted through the display unit 4 or the speaker 5.

As shown in FIG. 8, the recognition words stored in the recognition word storing unit 113 correspond to the recognition word codes 21 that are recognized by the voice recognition unit 10. These recognition words correspond to the speech contents recognized by the recognition program processing unit 102.

As explained above, the final message includes the recognition word corresponding to the recognition word code 21 sent from the voice recognition unit 10. Thereby, the final message is notified to the user by using the recognition word corresponding to the same speech uttered by the user.

Figure 10:
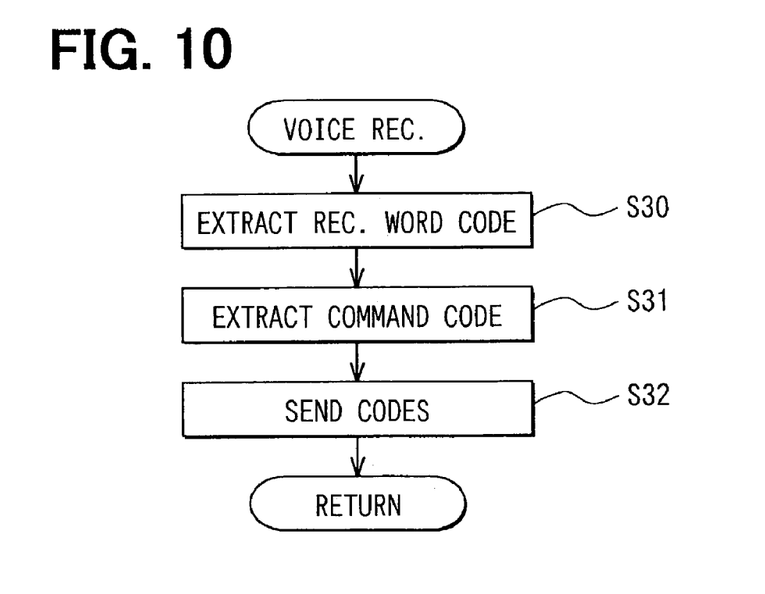
FIG. 10 is a flowchart diagram explaining processing of voice recognition according to the embodiment.
Figure 11:
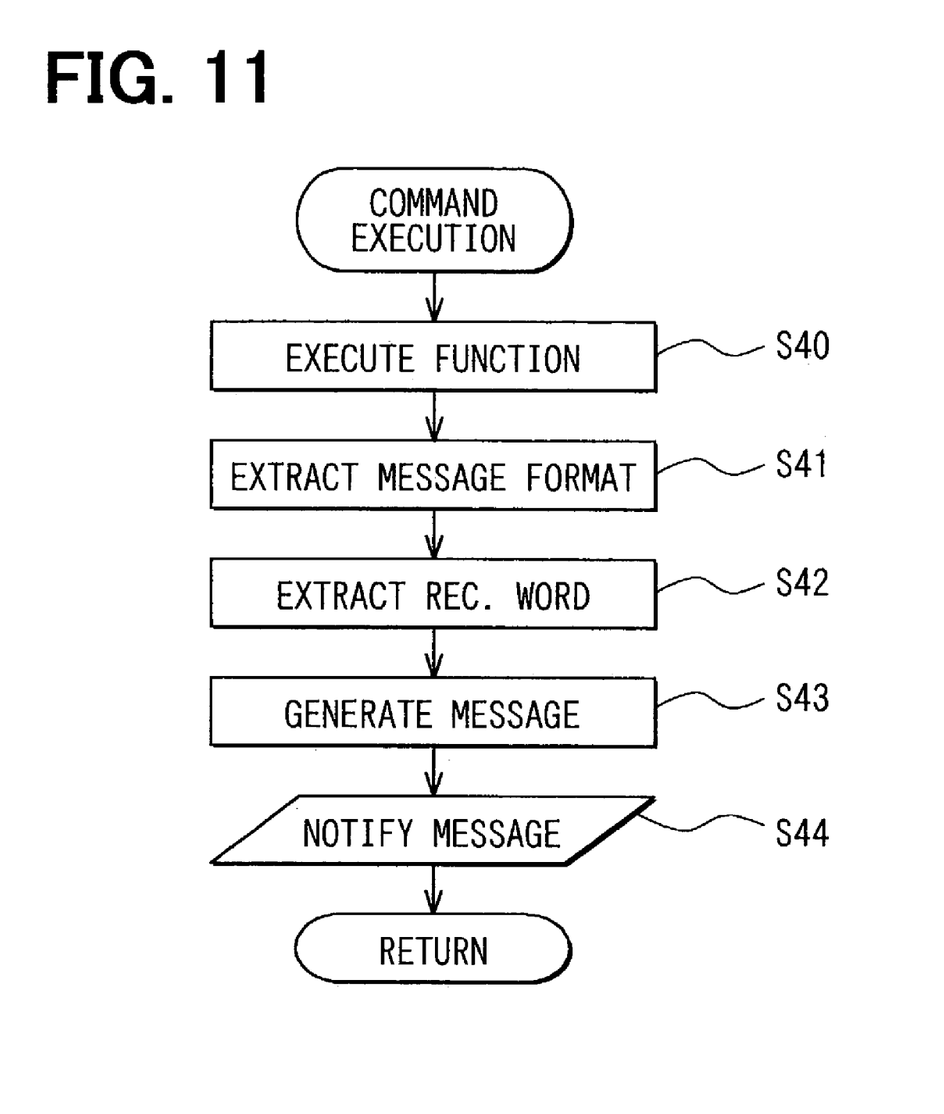
FIG. 11 is a flowchart diagram explaining processing of command execution according to the embodiment.

Processing of the car navigation device will be explained from when a voice input is executed to when a final message is notified, referring to FIGS. 9, 10, and 11. As an instance, a case where a speech of "zoom in" is uttered is explained.

Figure 9:
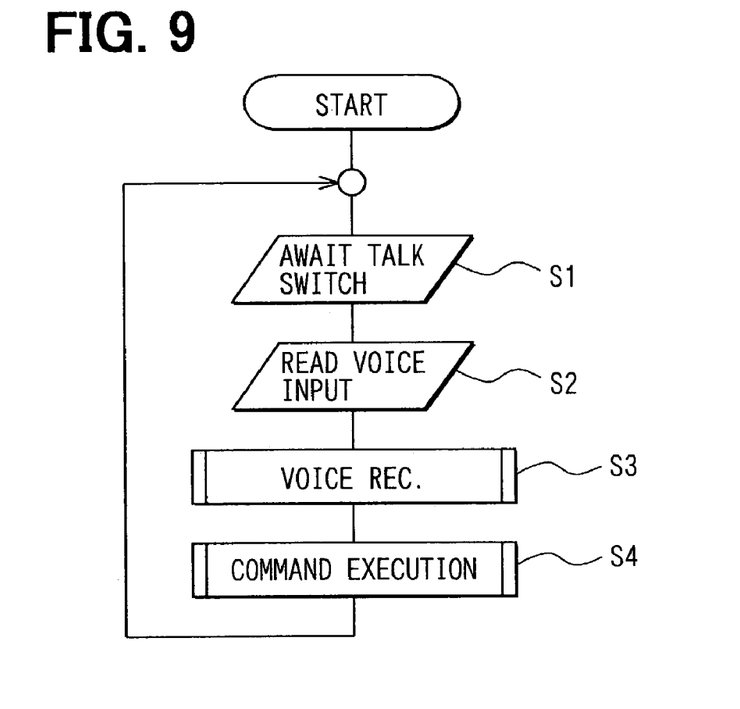
FIG. 9 is a flowchart diagram explaining overall processing of the car navigation system according to the embodiment.

At Step 1, as shown in FIG. 9, a waiting state continues till the talk switch 3 is pushed by the user, and processing proceeds to Step 2 when the talk switch 3 is pushed. At Step 2, the voice recognition unit 10 shifts to the input mode where the voice input can be accepted. Here, as "zoom in" is inputted, the processing proceeds to Step 3.

Voice recognition processing at Step 3 will be explained referring to FIG. 10. At Step 30, the inputted speech is analyzed for determining the speech content, and the recognition word code 21 corresponding to the speech content is extracted from the recognition dictionary storing unit 104. Here, the uttered speech of "zoom in" is analyzed to determine the recognition word of "ZOOM-IN," and the recognition word code 21 (R0003) corresponding to "ZOOM-IN" is extracted.

At Step 31, the command code 22 corresponding to the extracted recognition word code 21 is extracted from the command code storing unit 105. Here, the command code (C0002) corresponding to the recognition word code 21 (R0003) is extracted. At Step 32, the extracted recognition word code 21 and the command code 22 are sent to the route assistance unit 11.

Command execution processing at Step 4 in FIG. 9 will be explained referring to FIG. 11. At Step 40, the function corresponding to the command code 22 (C0002) sent from the voice recognition unit 10 is executed by the function execution unit 110. Here, a function of scaling up the road map shown on the display unit 4 is executed. Whether the function succeeds in being executed is determined by the function execution unit 110. When it is determined that the function succeeds in being executed, an execution result 114 of "SUCCESS" is sent to the message outputting unit 111. When it is determined that the function does not succeed in being executed, an execution result 114 of "FAILURE" is sent to the message outputting unit 111. Hereafter, "SUCCESS" is assumed to be sent.

At Step 41, the message outputting unit 111 extracts, from the message storing unit 112, a message format corresponding to the command code 22 and execution result sent from the function execution unit 110. Here, since the command code 22 is C0002 and the execution result is "SUCCESS," a message of "MAP IS TO BE (REC. WORD)" is extracted, as shown in FIG. 7.

At Step 43, the extracted recognition word is properly inserted to (REC. WORD) in the extracted message format, so that the final message format is generated. Here, "MAP IS TO BE ZOOMED IN" is generated as the final message.

At Step 44, the final message is converted to image signals 15 or voice guidance 16 to be outputted via the display unit 4 or the speaker 5. Thus, the car navigation device 1 can notify to the user an adequate message corresponding to the speech uttered by the user.

As explained above, the voice control system of the present invention generates a message utilizing the speech content that is recognized by inputting the speech uttered by the user. Therefore, the notified message corresponds to the uttered speech. For instance, in the case of the above embodiment where the road map is zoomed in, the recognition word corresponding to the speech content is properly inserted to the notified message. When the user utters "zoom in" or "enlarge," the final message becomes "MAP IS TO BE ZOOMED IN" or "MAP IS TO BE ENLARGED," respectively. Thereby, the user is prevented from misunderstanding that an uttered speech is mis-recognized.

Furthermore, in the embodiment, a message corresponding to the execution result is notified. For instance, it is assumed that the user inputs "enlarge" by mistake when a road map is already scaled up to the maximum. In this case, since the voice control system cannot execute the scaling-up of the road map, a message of "MAP IS NO MORE ZOOMED IN" is generated. Since the message based on the execution result is generated, the message corresponding to the execution result is thus notified even when the user inputs by mistake.

(Modification)

In the above embodiment, the corresponding message format is extracted from the message storing unit 112 by using the command code 22 and execution result 114 sent to the message outputting unit 111. However, the corresponding message format can be extracted by using the recognition word code 21 and execution result 114 sent from the voice recognition unit 10 to the message outputting unit 111.

Furthermore, the present invention can be directed not only to the car navigation device but also other devices such as an electric appliance or a robot, to which the voice recognition can be adopted.

What is claimed is:

1. A voice control system comprising:
   voice inputting means for inputting a speech uttered by a user;
   recognizing means for recognizing the uttered speech as a speech content;
   command code storing means for storing, as a pair, the speech content and a command code used for executing a function of a control object, wherein the command code is correlated with different speech contents for the uttered speech and the command code has one-to-one or one-to-many correspondence with the speech content;
   extracting means for extracting, from the command code storing means, the command code based on the speech content as which the uttered speech is recognized when the speech is inputted;
   controlling means for executing the function based on the command code extracted by the extracting means;

message generating means for generating a message corresponding to the executed function when the function is executed through the command code; and notifying means for notifying the generated message, wherein the message generating means generates the message by utilizing the recognized speech content in a case that the command code correlates to different speech contents.

2. A voice control system according to claim 1, wherein the message generating means generates the message using a whole of the recognized speech content.

3. A voice control system according to claim 1, wherein the message generating means generates the message based on a basic message corresponding to the command code.

4. A voice control system according to claim 1, wherein the message generating means generates the message based on an execution result of the function that is executed through the command code.

5. A voice control system according to claim 1, wherein the message generating means generates the message by combining a basic message with the recognized speech content, wherein the basic message corresponds to the function that is executed through the command code.

6. A voice control system according to claim 1, wherein the control object includes a car navigation system, and wherein the command code corresponds to a function of switching a scale of a road map that is shown in a displaying unit of the car navigation system.

7. A voice control system comprising:

voice inputting means for inputting a speech uttered by a user;

recognizing means for recognizing the uttered speech as a speech content;

code storing means for storing, as a pair, a recognition word code corresponding to the speech content and a command code used for executing a function of a control object, wherein the command code is correlated with different speech contents and the command code has one-to-one or one-to-many correspondence with the recognition word code;

extracting means for extracting, from the code storing means, the command code based on the recognition word code corresponding to the speech content as which the uttered speech is recognized when the speech is inputted;

controlling means for executing the function based on the command code extracted by the extracting means;

message generating means for generating a message corresponding to the executed function when the function is executed through the command code; and notifying means for notifying the generated message, wherein, in a case that the command code correlates to different speech contents, the message generating means generates the message by utilizing the recognized speech content to which the recognition word code corresponds.

8. A voice control system according to claim 7, wherein the message generating means generates the message using a whole of the recognized speech content.

9. A voice control system according to claim 7, wherein the message generating means generates the message based on a basic message corresponding to the command code.

10. A voice control system according to claim 7, wherein the message generating means generates the message based on an execution result of the function that is executed through the command code.

11. A voice control system according to claim 7, wherein the message generating means generates the message by combining a basic message with the recognized speech content, wherein the basic message corresponds to the function that is executed through the command code.

12. A voice control system according to claim 7, wherein the control object includes a car navigation system, and wherein the command code corresponds to a function of switching a scale of a road map that is shown in a displaying unit of the car navigation system.

13. A voice control method comprising steps of:

inputting a speech uttered by a user;

recognizing the uttered speech as a speech content;

storing, as a pair, the speech content and a command code used for executing a function of a control object, wherein the command code is correlated with different speech contents for the uttered speech and the command code has one-to-one or one-to-many correspondence with the speech content;

extracting the stored command code based on the speech content as which the uttered speech is recognized when the speech is inputted;

executing the function based on the extracted command code;

generating a message corresponding to the executed function when the function is executed through the command code, wherein, in a case that the command code correlates to different speech contents, the message is generated by utilizing the recognized speech content; and notifying the generated message.

* * * * *